United States Patent Office 3,253,936
Patented May 31, 1966

3,253,936
CASTABLE FIBROUS REFRACTORY COMPOSITIONS AND ARTICLES OBTAINED THEREFROM
Herman F. Weindel, Uniondale, N.Y., assignor to Socony Mobil Oil Company, Inc., a corporation of New York
No Drawing. Filed June 10, 1963, Ser. No. 286,526
5 Claims. (Cl. 106—64)

This invention is directed to castable fibrous refractory compositions which are capable of being cast into improved refractory articles of various shapes using simple casting techniques.

The use of fibrous refractory materials in the production of refractory elements used in various furnaces, reactors, etc. is known. In general, the refractory elements are produced by mixing the fibrous refractory materials with a suitable binder such as a water suspension of a silica material to form a free flowing castable mix which is then cast.

The production of refractory elements from these fibrous refractory materials using simple, conventional casting techniques, does, however, present several problems. First of all, excessive periods of time are required for the compositions to harden or set. The compositions also have a tendency to shrink as much as 10 percent by volume thereby rendering difficult the production of large numbers of refractory elements possessing uniform dimensions. In addition, the resulting cast refractory articles often possess poor mechanical strength.

The use of special techniques, such as pressure or vacuum-casting has been proposed as a possible means for obviating these difficulties. These techniques, however, require considerable amounts of equipment and their use therefore is often only justified where large numbers of refractory articles are to be produced. Another drawback to these special techniques is that, in general, only castings possessing relatively simple physical configurations can be produced from fibrous refractory materials; these techniques not being suitable for the production of refractory articles possessing substantially irregular shapes.

According to the present invention, I have found that these aforementioned difficulties can be largely eliminated by the use of casting compositions containing certain fibrous refractory materials and a hydration-type binder compound.

I have also discovered that improved castable compositions are obtained by adding the hydration binder compound to compositions containing the fibrous refractory materials and a non-hydration type binder compound.

It is therefore an object of the invention to provide novel fibrous refractory compositions which are capable of being cast into a variety of physical configurations using simple techniques.

A further object is to provide cast refractory articles of a variety of physical shapes possessing good chemical and thermal characteristics.

Another object is to provide a simple and effective method for producing these shaped refractory articles.

Other objects of the invention and the advantages thereof will become apparent hereinafter.

In general, the hydration binders used in conjunction with the fibrous refractory materials, according to the present invention, are those which are capable of imparting the required mechanical strength to cast refractory elements as well as both transforming the water present in the casting composition into hydrate form and retaining this water of hydration at the temperatures to which the final casting is expected to be exposed.

More particularly, the hydration binder compounds which are used in the castable compositions of the present invention are selected from calcium aluminate ($CaAl_2O_4$ or $CaO.Al_2O_3$) and certain hydraulic cements known as high-alumina or calcium aluminate cements, containing predominant proportions (more than 50%) of calcium aluminate. The term calcium aluminate distinguishes these cements from other cement materials such as Portland cement wherein calcium silicates are the principal constituents.

These hydration-type binders act by reacting with the water present in the casting mixture to form hydration products, thus insuring that the major portion of this water is retained upon the setting of the casting. The hydration binders therefore effect the setting of the casting by means of a hydration mechanism as distinguished from an evaporation mechanism.

The use of calcium aluminate or calcium aluminate cements as the hydration binder is critical. Thus the employment of other binder materials, including those which function by a hydration mechanism such as Portland cement, does not result in the superior castable compositions of this invention.

The particular amount of hydration binder employed will depend on the particular nature of the other materials present in the casting composition. The hydration binder must be employed in an amount sufficient to form hydration products with predominant amounts of the water present in the castable composition. In general, from about 2 to about 60%, preferably from about 10 to 40%, based on the weight casting composition, is used.

The particular refractory materials employed in the casting compositions of this invention are alumina-silica fibers containing from about 5–95% alumina and from about 5–95% silica, or potassium titanate fibers. Refractory materials of this type may be present in a very finely divided state so long as they possess the fiber structure.

In general, these refractory fibers possess a weight in the range from about 10 to about 120 lbs. per cubic ft. of material. Alumina-silica fibers in the range from about 70 to about 90 lbs. per cubic ft., and potassium titanate fibers in the range from about 30 to about 40 lbs. per cubic ft. are preferred.

Particularly good results are obtained when milled alumina-silica fibers of the type supplied under the name "Fiberfrax 100" are employed. Fibrous materials of this type are light weight, inert to most acids and retain their desirable properties at temperatures as high as 3000° F. Potassium titanate fibers of the type supplied under the name "Tipersul" are also suitable for use.

The refractory fibers may be used in amounts from about 20 to about 90%, preferably from about 40 to about 80%, based on the weight of the castable composition.

According to a preferred aspect of the present invention, it has been found that the addition of the aforementioned hydration binder materials to castable compositions containing either alumina-silica fibers or potassium titanate fibers as well as a non-hydration binder material, results in castable compositions which are capable of being formed, in an advantageous manner, into shaped articles possessing particularly superior mechanical and thermal characteristics.

The non-hydration binders are materials which either, because of their chemical composition or particular physical form (e.g., water dispersions or aqueous solutions), cause the setting of the castable composition to proceed by an evaporation mechanism.

Suitable non-hydration binder materials include aqueous solutions or colloidal dispersions of Groups I or II metal aluminates or metal silicates in water and aqueous colloidal dispersions or suspensions of silica. The amounts of water present as the solvent or dispersing phase in these non-hydration binder materials can, of course, vary widely depending on the particular material. The only requirement is that at least enough water be used to form the solution or dispersion. Colloidal suspensions or dispersions of silica containing from about 45 to 85% water are particularly preferred.

The proportions of the non-hydration binder will depend on the nature and amount of the other components of the composition.

Generally, the amount of non-hydration binder material used varies from about 2 to about 40% of the castable composition.

The amount of water present in the entire castable composition may also vary considerably. It is preferred to employ water in sufficient amounts so as to form a substantially free-flowing mix having the appearance of conventional concrete mixes. In general, the total water content may vary from about 5 to about 40% of the weight of the composition.

The water may be added as such to the other components, or when non-hydration binders are used, either a portion of or the entire amount of water may be contained in this binder composition and added to the castable composition in this form.

The castable compositions of this invention surprisingly possess the following principal advantages:

(1) Only a very small amount of shrinkage occurs during the setting of the castings. The casting compositions shrink during setting generally no more than about 3%.

(2) A significant decrease in the time necessary for the casting to set is obtained. For example, fibrous casting compositions which lack a hydration-type binder may require several days to set, whereas a similar casting composition containing the hydration binder requires a setting time of only a few hours.

(3) Conventional simple casting techniques using either open or closed molds can be used. There is no need to resort to pressure injection and vacuum techniques which often require considerable apparatus.

(4) The castings produced from the instant fibrous refractory compositions containing hydrate binders possess mechanical characteristics significantly superior to castings prepared from compositions lacking this type of binder.

The castable compositions of the present invention may further contain effective amounts of other ingredients normally used in compositions of this type such as pigments, accelerators, retarders, workability agents, gas-forming agents, etc.

Refractory castings of any desired shape and size may be prepared from the instant compositions by employing simple casting techniques. Thus, for example, the castable composition in the form of a flowable mass at room temperature may be poured into a suitable mold. The casting is allowed a sufficient time to set and the mold is then removed. Of course, other and more complicated casting techniques using elevated temperatures, controlled pressure, etc., may be employed, but it is a particular advantage of the castable compositions of the present invention that the use of such techniques is not necessary in order to produce refractory castings possessing good mechanical characteristics even at temperatures of the order of 2000–3000° F. or higher.

The following specific embodiments are given in order to further illustrate the present invention. Unless otherwise indicated all parts and proportions are by weight.

EXAMPLE 1

Twenty casting compositions containing the following:

19 gm. (40.8%) of alumina-silica fibers, supplied under the name "Fiberfrax 100,"

17 gm. (36.6%) calcium aluminate (approximately 99% pure), and 10.5 gm. (22.6%) of a suspension of colloidal silica in water containing about 35% silica and supplied under the name "Rigidizer" (water comprises about 14% of the total casting composition), were prepared and cast to form refractory elements suitable for use as burner air cones in gun-type oil burners.

CASTING PROCEDURE

The burner air cones were cast in 2 or 3 piece silicon rubber molds. Except for the pouring and vent holes, the molds were closed. The required amount of refractory material was mixed with water and/or binder, forming a flowable material having a consistency approximating common concrete. The mix, at room temperature, was poured through the mold pouring hole into the mold. Entrained air bubbles were removed through the vent holes with the aid of vibration. The use of vibration is optional and depends upon mold complexity and desired casting finish. The refractory casting was allowed sufficient time to set and the mold was then removed. The small amount of free water, which was not used in the hydration reaction and which remained in the casting, was removed by drying at 100° F.

*Examples 2–5*

Four casting mixes were prepared. Three of these mixes contained calcium aluminate as the hydration binder, while the remaining mix contained no hydration binder material.

Each of the mixes was then cast in a 1-piece test mold (1.465 inches long and .735 inch in diameter). The set time, the linear shrinkage, and the casting density (gm./cc.) were determined for each mix. The results are reported in the following table.

TABLE

| Example No. | Casting Mix Composition [3] | Set Time (Room Temp.) | Linear Shrinkage, Percent | Casting Density gm./cc. |
| --- | --- | --- | --- | --- |
| 2 | 75% (30 g.) milled alumina-silica fibers [1]<br>25% (10 g.) silica suspension [2] | Approx. 48 hours | 9.1 | 1.81 |
| 3 | 62.5% (25 g.) milled alumina-silica fibers<br>12.5% (5 g.) calcium aluminate cement<br>25% (10 g.) silica suspension | 3 hours | 3.2 | 1.76 |
| 4 | 50% (20 g.) milled alumina-silica fibers<br>25% (10 g.) calcium aluminate cement<br>25% (10 g.) silica suspension | 2 hours | 2.4 | 1.75 |
| 5 | 40.8% (19 g.) milled alumina-silica fibers<br>36.6% (17 g.) calcium aluminate cement<br>22.6% (10.5 g.) silica suspension | 2 hours | 1.1 | 1.78 |

[1] Alumina-silica fibers supplied under the name "Fiberfrax 100".
[2] A suspension of colloidal silica in water containing about 35% by weight of silica and supplied under the name "Rigidizer."
[3] The water present in the silica suspension comprises approximately 16% of the mix in Examples 2–4 and approximately 14% of the mix in Example 5.

It will be seen from the results reported in the table that the castable compositions of Examples 3–5, which contained the hydration binder, set in 3 hours or less, and exhibited a linear shrinkage of no more than 3.2%. By contrast, the castable composition of Example 2 required 48 hours to set and exhibited a linear shrinkage of 9.1%.

While certain representative embodiments and details have been set forth for the purpose of illustrating the invention, it will be apparent to those skilled in the art that various changes and modifications may be made therefrom without departing from the spirit and scope of the present invention.

Having thus fully described the invention, what I desire to secure and claim by Letters Patent is:

1. A castable composition suitable for producing refractory articles consisting essentially of
   (1) from about 20% to about 90% by weight of total composition of a fibrous refractory material selected from the group consisting of alumina-silica fibers and potassium titanate fibers;
   (2) from about 2% to about 60% by weight of total composition of calcium aluminate hydration binder;
   (3) from about 2% to about 40% by weight of total composition of silica in the form of an aqueous colloidal dispersion containing from about 15% to about 55% by weight of silica; and
   (4) the remainder of said composition being water in sufficient quantity to form hydration products with said calcium aluminate hydration binder material.

2. The composition of claim 1 in which the said fiber is alumina-silica fiber.

3. A castable composition suitable for producing refractory articles consisting essentially of
   (1) from about 40% to about 80% by weight of total composition of alumina silica fibers;
   2) from about 10% to about 40% by weight of calcium aluminate;
   (3) from about 2% to about 40% by weight of silica in the form of an aqueous colloidal dispersion containing from about 15% to about 55% by weight of silica and
   (4) the remainder of said composition being water in sufficient quantity to form hydration products with said calcium aluminate hydration binder.

4. A process for preparing shaped refractory articles which comprises the steps of
   (A) forming a composition containing (1) from about 20% to about 90% by weight of a fibrous refractory material selected from the group consisting of alumina-silica fibers and potassium titanate fibers, (2) from about 2% to about 60% by weight of calcium aluminate hydration binder, (3) from about 2% to about 40% by weight of a mixture of water and silica in the form of an aqueous colloidal dispersion containing from about 15% to about 55% by weight of silica, and (4) water in sufficient quantity to form hydration products with said calcium aluminate and to render said composition a flowable mass,
   (B) pouring said composition into a mold,
   (C) closing said mold and allowing said composition to set, while removing any air bubbles from said mold-enclosed composition, and
   (D) separating said mold from the set composition and removing any residual water therefrom.

5. The process of claim 4 wherein the amount of calcium aluminate is from about 10% to about 40% by weight.

References Cited by the Examiner

UNITED STATES PATENTS

| | | | |
|---|---|---|---|
| 2,793,128 | 5/1957 | Emhiser | 106—104 |
| 2,917,426 | 12/1959 | Bugosh | 106—39 |
| 3,100,734 | 8/1963 | Rex | 106—65 |

TOBIAS E. LEVOW, *Primary Examiner.*